(12) United States Patent
Terai et al.

(10) Patent No.: US 7,054,400 B2
(45) Date of Patent: May 30, 2006

(54) DIGITAL AV SIGNAL PROCESSING APPARATUS

(75) Inventors: Kenichi Terai, Shijonawate (JP); Hiroyuki Hashimoto, Ibaraki (JP); Hiroyuki Kotani, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 792 days.

(21) Appl. No.: 09/974,442

(22) Filed: Oct. 10, 2001

(65) Prior Publication Data

US 2002/0044224 A1    Apr. 18, 2002

(30) Foreign Application Priority Data

Oct. 10, 2000    (JP) .............................. 2000-308751

(51) Int. Cl.
*H04L 7/00*    (2006.01)
*H04L 25/40*    (2006.01)

(52) U.S. Cl. ....................................... 375/355; 375/372

(58) Field of Classification Search ................ 375/371, 375/372, 355; 327/151, 147, 156, 160; 455/161.3, 455/184.1
See application file for complete search history.

(56) References Cited

U.S. PATENT DOCUMENTS

| | | | | |
|---|---|---|---|---|
| 4,833,535 A | * | 5/1989 | Ozeki et al. | 348/400.1 |
| 5,353,313 A | * | 10/1994 | Honea | 375/372 |
| 5,689,531 A | * | 11/1997 | Hickman | 375/316 |
| 6,252,919 B1 | * | 6/2001 | Lin | 375/377 |
| 6,415,006 B1 | * | 7/2002 | Rude | 375/372 |

FOREIGN PATENT DOCUMENTS

| | | |
|---|---|---|
| JP | 2-76365 | 6/1990 |
| JP | 2000-092130 | 3/2000 |

\* cited by examiner

*Primary Examiner*—Kevin Kim
(74) *Attorney, Agent, or Firm*—Snell & Wilmer L.L.P.

(57) ABSTRACT

A digital AV signal processing apparatus includes a buffer for storing digital data input to the digital AV signal processing apparatus, and outputting the digital data as output digital data, a D/A converter for converting the output digital data to analog data, a voltage-controlled oscillator for generating a clock signal to control a conversion rate of the D/A converter, and a voltage-controlled oscillator controller for detecting a data amount of the digital data stored in the buffer, and controlling a frequency of the clock signal based on a deviation in the detected data amount from a first predetermined value and a time integral of the deviation value.

11 Claims, 9 Drawing Sheets

DIGITAL AV SIGNAL PROCESSING APPARATUS

BACKGROUND OF THE INVENTION

1. Field of the Invention

The present invention relates to a digital AV signal processing apparatus. More particularly, the present invention relates to a digital AV signal processing apparatus capable of controlling a rate of digital-to-analog (hereinafter referred to as D/A) conversion of digital data stored in a buffer.

2. Description of the Related Art

Recently, as computer networks have become widespread, digital audio and video (hereinafter referred to as AV) signals representing AV content are increasingly distributed via computer networks, and the digital AV signals are received by receiver apparatuses while the signals are reproduced (by D/A conversion). Such a form of audience of AV content is becoming popular.

In computer networks, a data transmission rate may fluctuate, causing short-cycle fluctuations (e.g., jitter) in transmitted data. Further, clocks are not synchronized with each other between transmitter apparatuses (e.g., a server and a personal computer) and receiver apparatuses (e.g., a digital AV signal processing apparatus), so that differences in clock between transmitter apparatuses and receiver apparatuses are present.

When typical data to be processed by computers are transmitted, such a jitter or a clock difference does not cause a problem. However, when a digital AV signal is transmitted, a jitter or a clock difference does cause problems. A jitter or a clock difference leads to uncomfortable disruptions in audio or video signals (e.g., sound skip).

Therefore, a D/A conversion rate of digital data stored in a buffer needs to be controlled in order to eliminate uncomfortable disruptions in audio or video signals. To this end, techniques for controlling the D/A conversion rate of digital data stored in a buffer have been developed.

FIG. 12 is a diagram showing a configuration of a conventional digital AV signal processing apparatus 300. The digital AV signal processing apparatus 300 includes a buffer 31, a D/A converter 32, a voltage-controlled oscillator (hereinafter referred to as "VCO") 33, and a voltage-controlled oscillator controller (hereinafter referred to as "VCO controller") 34.

The buffer 31 stores digital data which has been input via a transmission system (e.g., a computer network) into the digital AV signal processing apparatus 300, and outputs the digital data as output digital data. The D/A converter 32 converts the output digital data to analog data. A conversion rate of the D/A converter 32 is determined by a clock signal generated by the VCO 33.

When the conversion rate of the D/A converter 32 is greater than an input rate of digital data input to the buffer 31, a data amount of the buffer 31 decreases. When the conversion rate of the D/A converter 32 is smaller than the input rate of digital data input to the buffer 31, the data amount of the buffer 31 increases.

The VCO controller 34 detects the data amount of the buffer 31, and controls the frequency of a clock signal generated by the VCO 33 in such a manner as to cause the conversion rate of the D/A converter 32 to be an appropriate value.

The VCO 33 receives output data DA3 output from the VCO controller 34. The greater the value of the output data DA3 output from the VCO controller 34, the greater the frequency of a clock signal which is controlled by the VCO 33. The smaller the value of the output data DA3 output from the adder 36, the smaller the frequency of a clock signal which is controlled by the VCO 33.

The VCO controller 34 includes a comparator 35, an adder 36, a reference data amount memory 37, and a reference voltage memory 38.

The reference data amount memory 37 stores the amount BHLF of data corresponding to a half of the total capacity of the buffer 31. The reference voltage memory 38 outputs output data DA2 which is used to generate a reference clock frequency. The adder 36 adds the value of output data DA1 with the value of the output data DA2 to output output data DA3.

FIG. 13 is a graph showing an operating characteristic of the comparator 35. The horizontal axis represents the amount BDAT of data in the buffer 31, while the vertical axis represents the output data DA1 output from the comparator 35. BMAX represents the amount of data corresponding to the total capacity of the buffer 31, while BHLF represents the amount of data corresponding to a half of the total capacity of the buffer 31.

As the data amount BDAT increases, the value of the output data DA1 output from the comparator 35 increases. As the value of the output data DA1 increases, the value of the output data DA3 increases. In this case, the frequency of a clock signal generated by the VCO 33 is raised so as to suppress the increase in the data amount BDAT. Conversely, as the data amount BDAT decreases, the value of the output data DA1 output from the comparator 35 decreases. As the value of the output data DA1 decreases, the value of the output data DA3 decreases. In this case, the frequency of a clock signal generated by the VCO 33 is reduced so as to suppress the decrease in the data amount BDAT.

With the above-described operations, the D/A conversion rate of digital data stored in a buffer is controlled.

FIG. 14 is a graph showing a change with time in an input rate of digital data input to the digital AV signal processing apparatus 300. The horizontal axis represents time. The vertical axis represents the input rate of digital data. Short-cycle fluctuations (jitter) in the input rate occur during time periods t1 to t2, t4 to t5, and t7 to t8. During time period t3 to t6, a long-cycle fluctuation occurs due to the unstable clock frequency of a server or a personal computer.

FIG. 15 is a graph showing the data amount of the buffer 31 in the case where digital data is input to the digital AV signal processing apparatus 300 at the input rate shown in FIG. 14. The horizontal axis represents time, while the vertical axis represents the data amount BDAT of the buffer 31. Times t1, t2, t3, t4, t5, t6, t7 and t8 correspond to times t1, t2, t3, t4, t5, t6, t7 and t8 of FIG. 14.

FIG. 16 is a graph showing a frequency of a reproduced clock signal generated by the VCO 33 in the case where digital data is input to the digital AV signal processing apparatus 300 at the input rate shown in FIG. 14. The horizontal axis represents time, while the vertical axis represents a frequency of a reproduced clock signal generated by the VCO 33. Times t1, t2, t3, t4, t5, t6, t7 and t8 respectively correspond to times t1, t2, t3, t4, t5, t6, t7 and t8 of FIG. 14.

Short-cycle fluctuations in the input rate shown in FIG. 14 (see times t1 to t2, t4 to t5, and t7 to t8 in FIG. 14), do not have much influence on the frequency of a reproduced clock signal. In other words, fluctuations (pitch fluctuations) in the frequency of a reproduced clock signal shown in FIG. 16 are suppressed (see times t1 to t2, t4 to t5, and t7 to t8 in FIG. 16), whereby the quality of reproduced sound is improved.

In the conventional digital AV signal processing apparatus 300, however, the frequency of a clock signal is controlled based on a deviation in the data amount of digital data stored in the buffer 31 from a predetermined value (e.g., BHLF, i.e., half the capacity of the buffer 31), whereby even when the data amount BDAT of the digital data stored in the buffer 31 remains constant while being deviated from the predetermined value (time t3 to t6 in FIG. 15), the frequency of a clock signal also remains constant (time t3 to t6 in FIG. 16). Therefore, when the input rate of digital data has long-cycle fluctuations, the data amount of digital data stored in the buffer 31 may remain deviated from the predetermined value. In this situation, overflow or underflow is likely to occur in the buffer.

SUMMARY OF THE INVENTION

According to an aspect of the present invention, a digital AV signal processing apparatus includes: a buffer for storing digital data input to the digital AV signal processing apparatus, and outputting the digital data as output digital data; a D/A converter for converting the output digital data to analog data; a voltage-controlled oscillator for generating a clock signal to control a conversion rate of the D/A converter; and a voltage-controlled oscillator controller for detecting a data amount of the digital data stored in the buffer, and controlling a frequency of the clock signal based on a deviation in the detected data amount from a first predetermined value and a time integral of the deviation value.

In one embodiment of this invention, the voltage-controlled oscillator controller may control the frequency of the clock signal in such a manner that a ratio of the amount of a change in the frequency of the clock signal with respect to the amount of a change in the deviation in the data amount of the buffer when the deviation exceeds a predetermined range, is set to be greater than when the deviation is below the predetermined range.

In one embodiment of this invention, the buffer may be a ring buffer. The digital data input may be input to the ring buffer from a writing position of the ring buffer. The ring buffer may output the digital data to a reading position of the ring buffer. The voltage-controlled oscillator controller may calculate the data amount of the digital data stored in the ring buffer based on the reading position and the writing position. The voltage-controlled oscillator controller may change at least one of the reading position and the writing position when the data amount exceeds a predetermined second value greater than the first predetermined value or when the data amount is below a third value less than the first predetermined value.

In one embodiment of this invention, the voltage-controlled oscillator controller may change at least one of the reading position and the writing position in such a manner that the data amount is substantially a half of a capacity of the ring buffer.

In one embodiment of this invention, the digital data may be input to the digital AV signal processing apparatus in the form of a plurality of packets, and the voltage-controlled oscillator controller may detect the data amount of the buffer in synchronization with a timing of the input of the plurality of packets.

In one embodiment of this invention, the digital data may be input to the digital AV signal processing apparatus in a form of a plurality of packet groups, each of the plurality of packet groups including a predetermined number of first packets having a first data amount and a predetermined number of second packets having a second data amount arranged in a predetermined sequence. The voltage-controlled oscillator controller may detect the data amount of the buffer in synchronization with a timing of the input of the plurality of packet groups.

Thus, the invention described herein makes possible the advantages of providing a digital AV signal processing apparatus capable of controlling a D/A conversion rate of digital data stored in a buffer in order to eliminate a deviation in the data amount of the buffer due to long-cycle fluctuations in an input rate of digital data.

These and other advantages of the present invention will become apparent to those skilled in the art upon reading and understanding the following detailed description with reference to the accompanying figures.

DESCRIPTION OF THE PREFERRED EMBODIMENTS

Hereinafter, the present invention will be described by way of illustrative examples with reference to the accompanying drawings.

Figure 1:
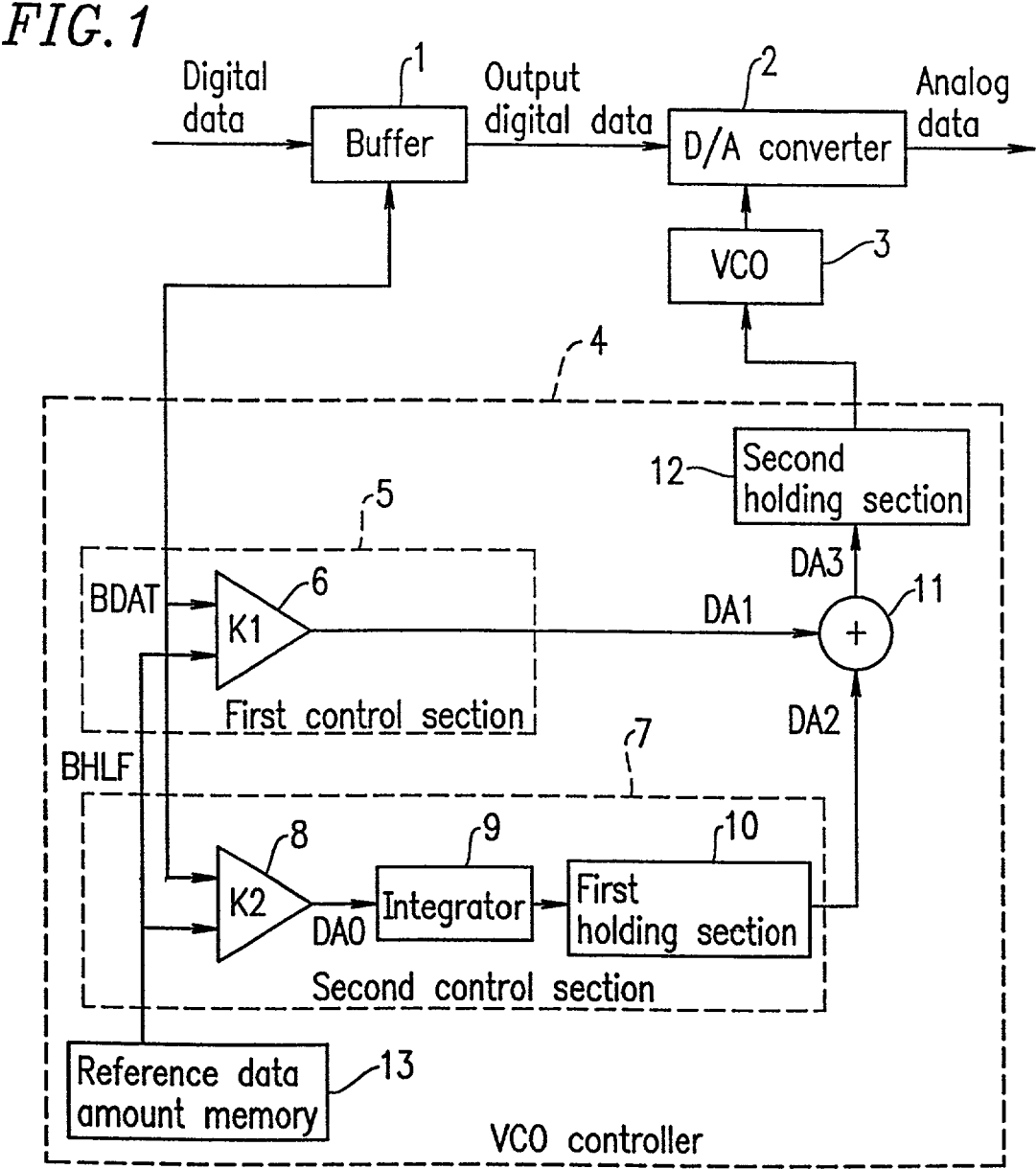
FIG. 1 is a diagram showing a configuration of a digital AV signal processing apparatus 100 according to an embodiment of the present invention.

FIG. 1 is a diagram showing a configuration of a digital AV signal processing apparatus 100 according to an embodiment of the present invention. The digital AV signal processing apparatus 100 includes a buffer 1, a D/A converter 2, a VCO 3, and a VCO controller 4.

The buffer 1 stores digital data input via a transmission system to the digital AV signal processing apparatus 100, and outputs digital data as output digital data. The D/A converter 2 converts the output digital data to analog data. The conversion rate of the D/A converter 2 is determined based on a clock signal generated by the VCO 3.

When the conversion rate of the D/A converter 2 is greater than the input rate of digital data input to the buffer 1, the data amount of the buffer 1 decreases. When the conversion rate of the D/A converter 2 is smaller than the input rate of digital data input to the buffer 1, the data amount of the buffer Increases. The VCO controller 4 detects the data amount of the digital data stored in the buffer 1, and controls the frequency of a clock signal generated by the VCO 3 based on a deviation in the detected data amount from a predetermined value and the time integral of the deviation.

The VCO controller 4 includes a first control section 5, a second control section 7, a reference data amount memory 13 storing the amount of data corresponding to a half of the total capacity of the buffer 1, an adder 11, and a second holding section 12.

The first control section 5 includes a first comparator 6 which compares the data amount BDAT of the buffer 1 with the data amount BHLF corresponding to a half of the total capacity of the buffer 1 (K1 represents gain). The first comparator 6 detects a deviation between the data amount BDAT and the data amount BHLF, and outputs output data DA1 based on the deviation and the gain K1 to the adder 11.

Figure 2:
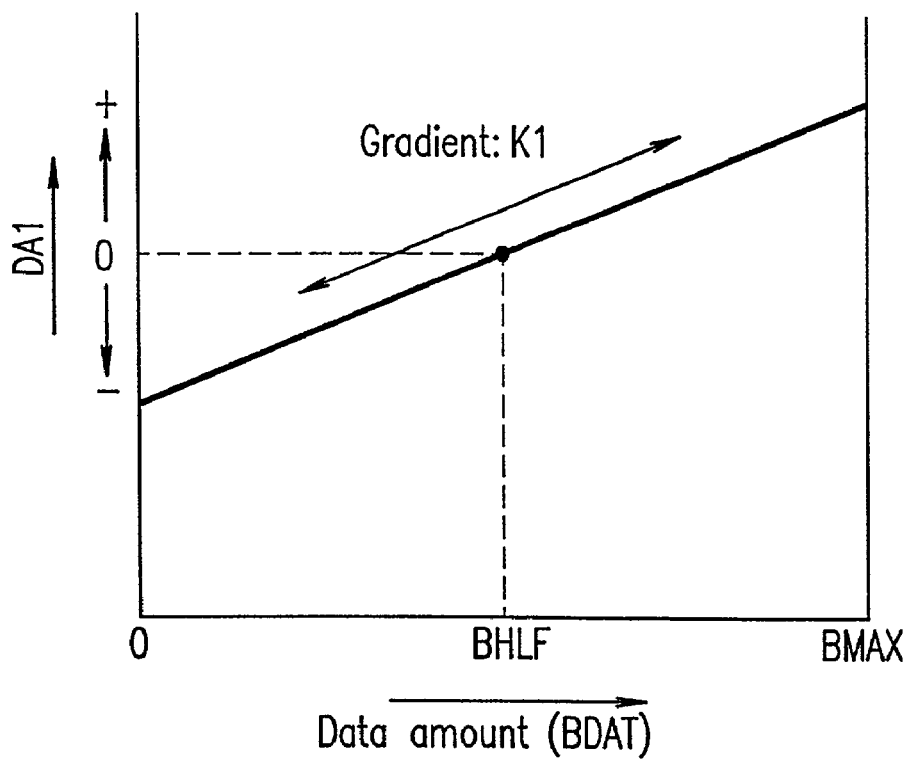
FIG. 2 is a graph showing an operating characteristic of a first comparator 6 shown in FIG. 1.

FIG. 2 is a graph showing an operating characteristic of the first comparator 6. The horizontal axis represents the data amount BDAT of the buffer 1, while the vertical axis represents the output data DA1 output from the first comparator 6. BMAX represents the amount of data corresponding to the total capacity of the buffer 1, while BHLF represents the amount of data corresponding to a half of the total capacity of the buffer 1. The operating characteristic of the first comparator 6 is set to pass through a point (BHLF, 0) when the gradient is K1. An operating cycle of the first control section 5 is set to be about 10 msec. A time constant of the first control section 5 is determined based on the operating characteristic (gradient K1) of the first comparator 6 and the operating cycle of the first control section 5.

The second control section 7 includes a second comparator 8 which compares the data amount BDAT of the buffer 1 with the amount BHLF (K2 represents gain), an integrator 9 which calculates a time integral of output data DA0 output from the second comparator 8, and a first holding section 10 which holds an output of the integrator 9.

Figure 3:
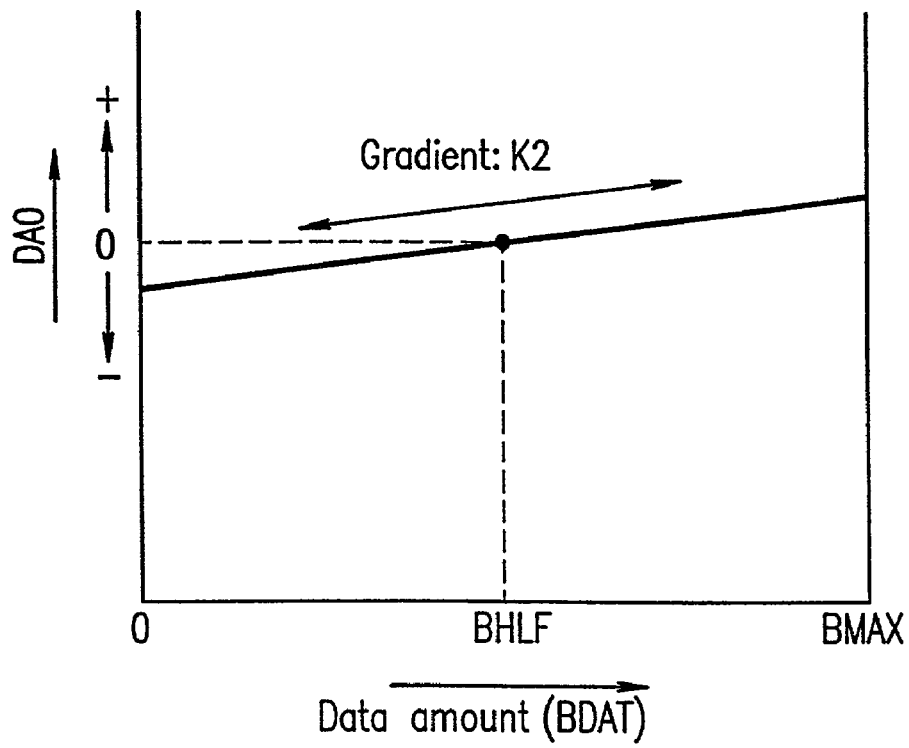
FIG. 3 is a graph showing an operating characteristic of a second comparator 8 shown in FIG. 1.

FIG. 3 is a graph showing an operating characteristic of the second comparator 8 of FIG. 1. The horizontal axis represents the data amount BDAT of the buffer 1, while the vertical axis represents the output data DA0 output from the second comparator 8. BMAX represents the amount of data corresponding to the total capacity of the buffer 1, while BHLF represents the amount of data corresponding to a half of the total capacity of the buffer 1. The operating characteristic of the second comparator 8 is set to pass through a point (BHLF, 0) when the gradient is K2. An operating cycle of the second control section 7 is set to be 100 msec. A time constant of the second control section 7 is determined based on the operating characteristic (gradient K2) of the second comparator 8 and the operating cycle of the second control section 7.

The gradient K2 is set to be much less than the gradient K1. The operating cycle of the first control section 5 is set to be 10 msec. The operating cycle of the second control section 7 is set to be 100 msec. In this case, 1/time constant=gradient/operating cycle. Therefore, the time constant of the first control section 5 is much less than the time constant of the second control section 7.

The second comparator 8 detects a deviation between the data amount BDAT and the data amount BHLF, and outputs the output data DA0 based on the deviation and the gain K2 to the integrator 9.

The integrator 9 calculates a time integral of the output data DA0 output from the second comparator 8. The time integral calculated by the integrator 9 is held by the first holding section 10.

The first holding section 10 outputs the held value as output data DA2 to the adder 11. The first holding section 10 updates the held value in a cycle of 100 msec. The first holding section 10 is required when a control cycle of the second control section 7 is set to be greater than a control cycle of the first control section 5.

The adder 11 adds the output data DA1 with the output data DA2 to calculate the output data DA3 of the VCO controller 4.

The second holding section 12 outputs the output data DA3 of the adder 11 to the VCO 3. The second holding section 12 updates the held value in a cycle of 10 msec.

As described above, the first control section 5, the second control section 7, the adder 11, the second holding section 12, and the reference data amount memory 13 collectively serve as the VCO controller 4 which detects the data amount of the digital data stored in the buffer 1, and controls the frequency of a clock signal based on a deviation in the detected data amount from a predetermined value and the time integral of the deviation.

Figure 4:
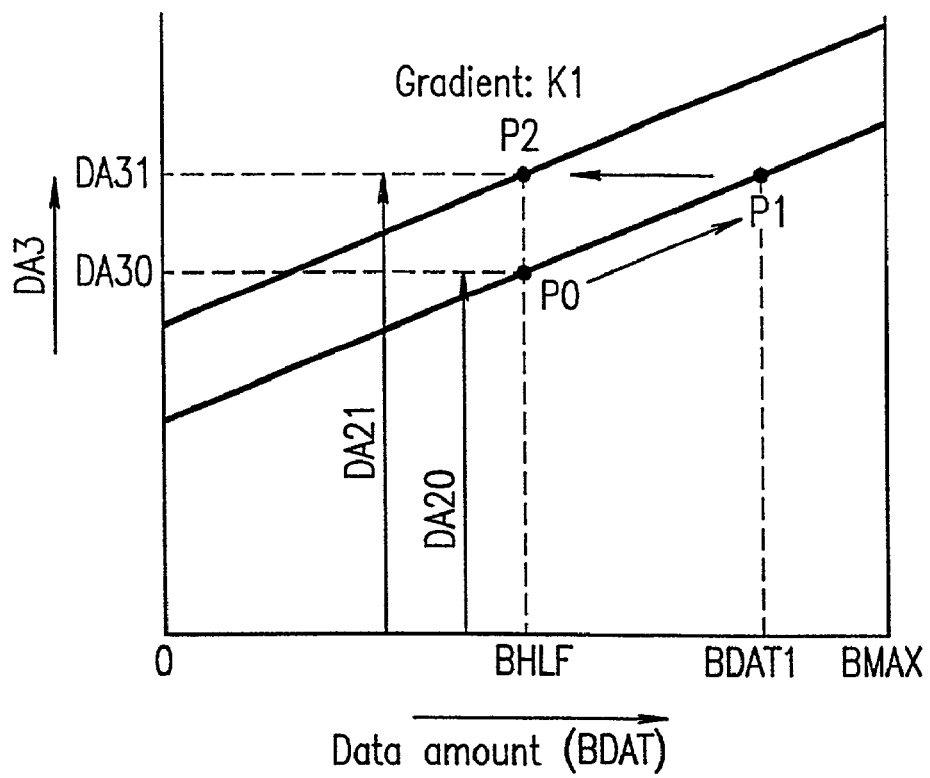
FIG. 4 is a graph showing an operating characteristic of a VCO controller 4 shown in FIG. 1.

FIG. 4 is a graph showing an operating characteristic of the VCO controller 4. The horizontal axis represents the data amount BDAT of the buffer 1, while the vertical axis represents the output data DA3 output from the VCO controller 4. BMAX represents the amount of data corresponding to the total capacity of the buffer 1, while BHLF represents the amount of data corresponding to a half of the total capacity of the buffer 1.

An operating point P0 represents a state at which the input rate of data is constant and the data amount of the buffer 1 is in a state of equilibrium, where the data amount of the buffer 1 corresponds to a half of the total capacity of the buffer 1 (BHLF−BDAT=0). At this time, the output data DA3 of the VCO controller 4 is DA30.

Referring to FIG. 4, it is assumed that digital data having fluctuations of a short cycle and a long cycle in the input rate are input to the digital AV signal processing apparatus 100 including the buffer 1.

When the short-cycle fluctuations in the input rate triggers an increase in the data amount of the buffer 1, the first control section 5 having a small time constant responds. As the value of the output data DA1 of the first control section 5 is increased, the operating point is shifted from P0 to P1. The VCO controller 4 generates output data DA31 so as to increase a clock frequency, so that the data amount is temporarily in a state of equilibrium at BDAT1.

Subsequently, as the value of the output data DA2 of the second control section 7 having a large time constant gradually increases from output data DA20, a deviation (BHLF−BDAT) in the data amount is shifted toward a smaller value than P1, i.e., P2. As deviation (BHLF−BDAT) in the data amount decreases, the absolute value of the output data DA1 of the first control section 5 decreases. The value of the output data DA1 and the value of the output data DA2 are cancelled with each other. As a result, P1 is translated to P2, i.e., the value of the output data DA3 is not changed from DA31.

Figure 5:
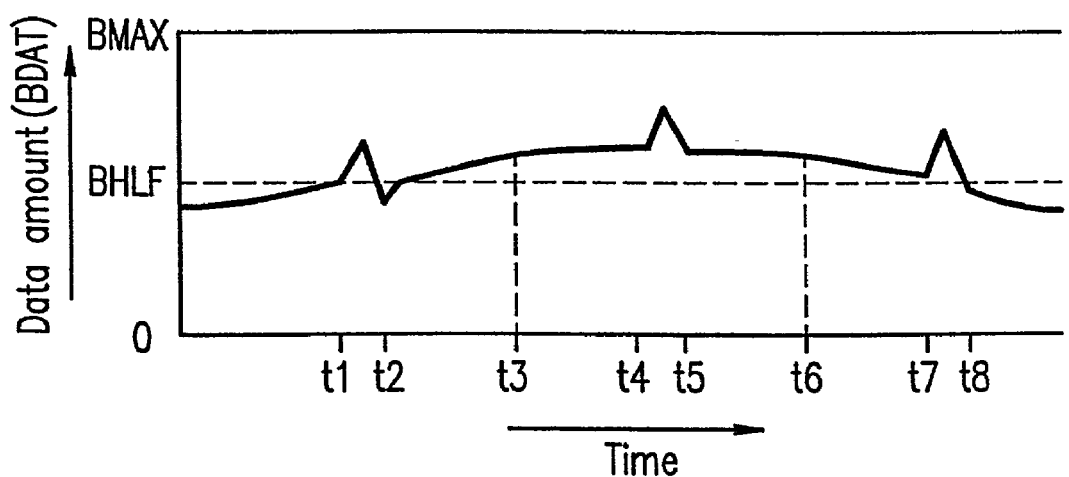
FIG. 5 is a graph showing fluctuations in the data amount of a buffer 1 shown in FIG. 1 when digital data having a characteristic shown in FIG. 14 is input to the digital AV signal processing apparatus 100 of FIG. 1 including the buffer 1.
Figure 14:
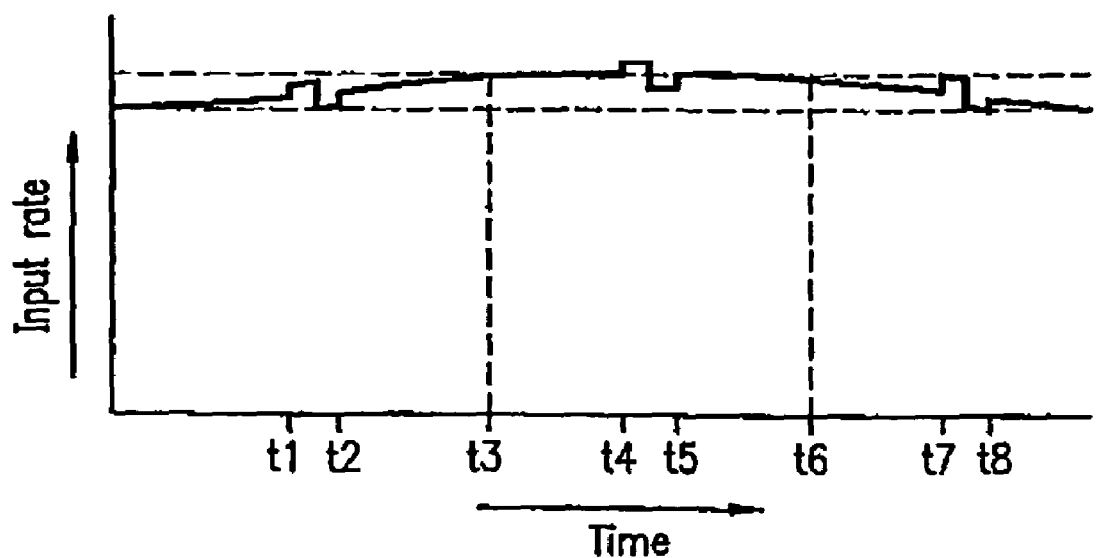
FIG. 14 is a graph showing a change with time in an input rate of digital data input to the digital AV signal processing apparatus 300 of FIG. 12.

FIG. 5 is a graph showing fluctuations in the data amount of the buffer 1 when digital data having a characteristic shown in FIG. 14 is input to the digital AV signal processing apparatus 100 including the buffer 1. The horizontal axis represents time. The vertical axis represents the data amount BDAT of the buffer 1. Times t1, t2, t3, t4, t5, t6, t7, and t8 of FIG. 5 respectively correspond to times t1, t2, t3, t4, t5, t6, t7, and t8 of FIG. 14.

Figure 6:
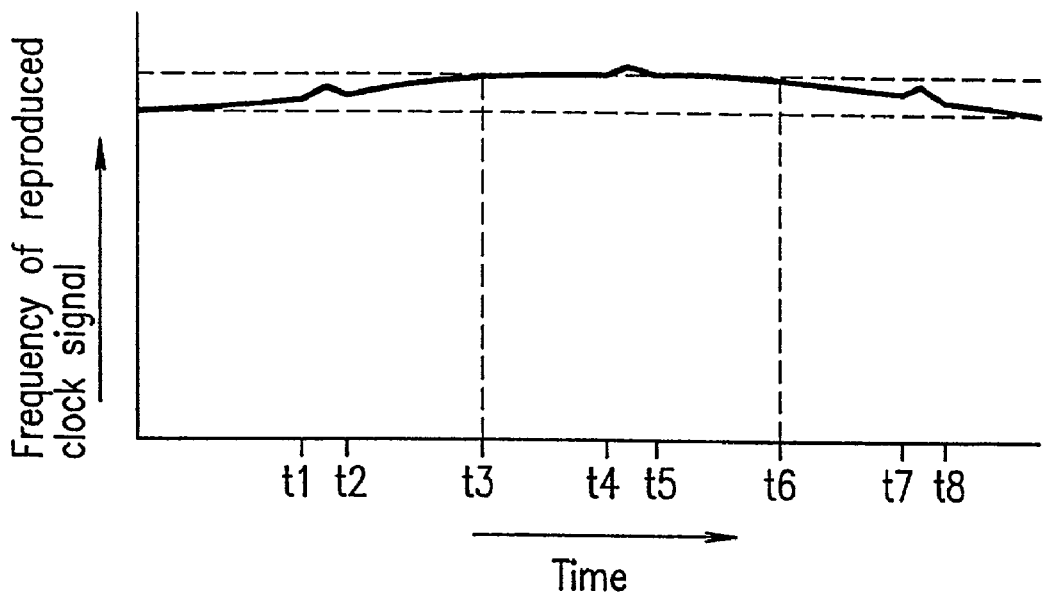
FIG. 6 is a graph showing fluctuations in the frequency of a reproduced clock signal generated by a VCO 3 shown in FIG. 1 when digital data having the characteristic shown in FIG. 14 is input to the digital AV signal processing apparatus 100 of FIG. 1 including the buffer 1.

FIG. 6 is a graph showing fluctuations in the frequency of a reproduced clock signal generated by the VCO 3 when digital data having a characteristic shown in FIG. 14 is input to the digital AV signal processing apparatus 100 including the buffer 1. The horizontal axis represents time, while the vertical axis represents the frequency of a reproduced clock signal generated by the VCO 3. Times t1, t2, t3, t4, t5, t6, t7, and t8 of FIG. 6 respectively correspond to times t1, t2, t3, t4, t5, t6, t7, and t8 of FIG. 5.

Figure 15:
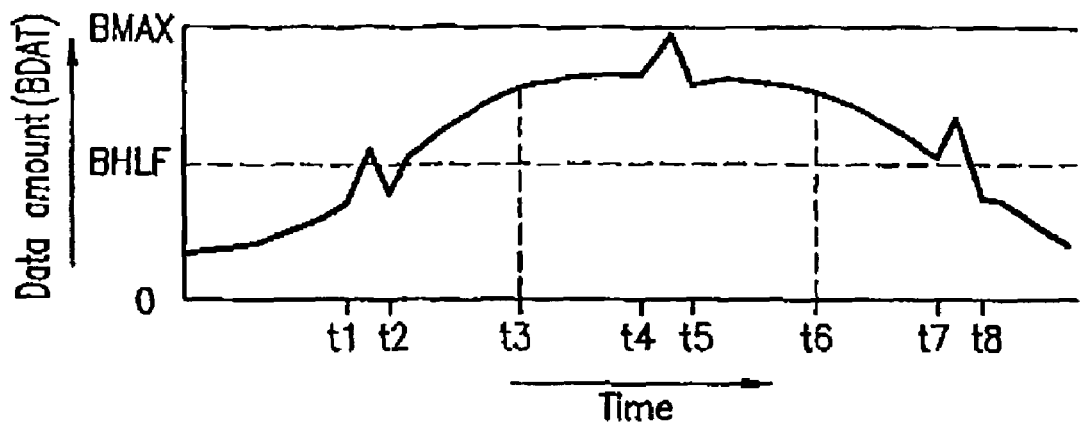
FIG. 15 is a graph showing a data amount of a buffer 31 shown in FIG. 12 in the case where digital data is input to the digital AV signal processing apparatus 300 of FIG. 12 at the input rate shown in FIG. 14.
Figure 16:
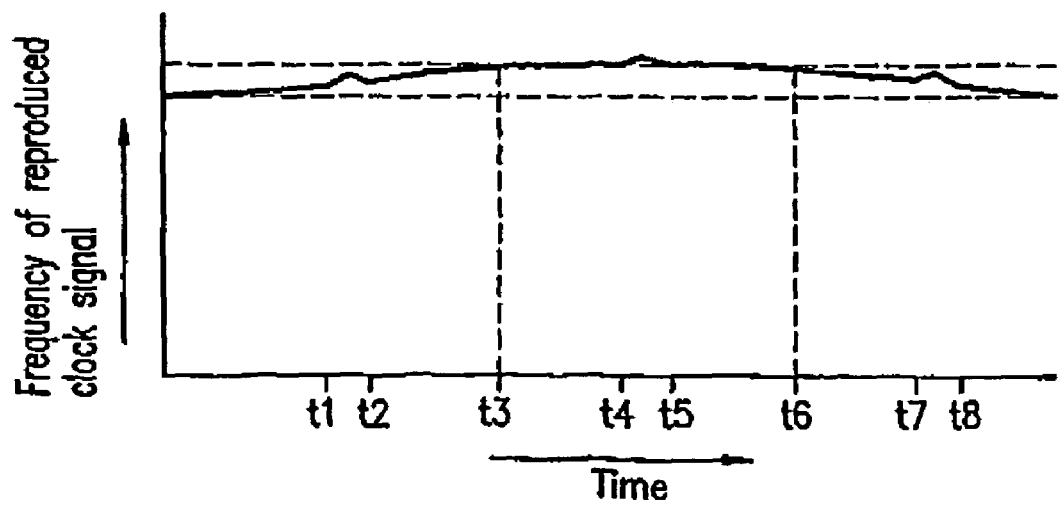
FIG. 16 is a graph showing a frequency of a reproduced clock signal generated by a VCO 33 shown in FIG. 12 in the case where digital data is input to the digital AV signal processing apparatus 300 of FIG. 12 at the input rate shown in FIG. 14.

Comparing FIG. 5 with FIG. 15, and FIG. 6 with FIG. 16, the digital AV signal processing apparatus 100 suppresses a deviation in the data amount of the buffer 1 due to long-cycle fluctuations in the input rate of digital data, while securing as much stability of a reproduction clock as is conventional, as compared to the conventional digital AV signal processing apparatus 300.

In this example of the present invention, all of the components of the VCO controller 4 are implemented by software on a microcomputer. The processing load of the VCO controller 4 is considerably small and therefore, the microcomputer used is not necessarily a special purpose microcomputer. The VCO controller 4 may be achieved by using a part of the processing capability of a system microcomputer for controlling the entire system.

Note that the digital AV signal processing apparatus 100 does not necessarily include the D/A converter 2. The digital AV signal processing apparatus 100 may output the output digital data to a loudspeaker system including a D/A converter, for example.

The data amount of the buffer 1 is preferably maintained to correspond to about a half of the total capacity of the buffer 1 in order to efficiently prevent overflow and underflow of the buffer 1. Therefore, the reference data amount memory 13 is set to store the amount of data corresponding to a half of the total capacity of the buffer 1. However, the data amount stored by the reference data amount memory 13 may correspond to substantially a half of the total capacity of the buffer 1. This is because in this case, overflow and underflow of the buffer 1 can be efficiently prevented.

According to the digital AV signal processing apparatus 100 according to the above-described example of the present invention, the frequency of a clock signal is controlled based on a deviation in the data amount of digital data stored in a buffer from a predetermined value and the time integral of the deviation.

When the deviation in the data amount of digital data stored in the buffer 1 from the predetermined value is steeply increased, a voltage-controlled oscillator controller can rapidly control the frequency of a clock signal based on the deviation in the data amount of digital data stored in the buffer 1 from the predetermined value. Therefore, when the input rate of digital data has short-cycle fluctuations, the data amount of digital data stored in a buffer can be controlled to match a predetermined value.

When the data amount of digital data stored in the buffer 1 remains constant while being deviated from the predetermined value, the time integral of the deviation is increased over time and therefore, the frequency of a clock signal is not maintained constant. Therefore, when the input rate of digital data has long-cycle fluctuations, the data amount of digital data stored in the buffer 1 can be controlled to match the predetermined value.

(Utilization of a Comparator having a Non-linear Operating Characteristic)

In the present invention, the first comparator 6 and the second comparator 8 do not need to have a linear operating characteristic.

When a deviation between the data amount BDAT of the buffer 1 and the amount BHLF of data corresponding to the total capacity of the buffer 1 exceeds a predetermined value, at least one of the first comparator 6 and the second comparator 8 may be set to have a steep operating characteristic. Further, at least one of the first comparator 6 and the second comparator 8 may be set to have a curved operating characteristic.

Figure 7:
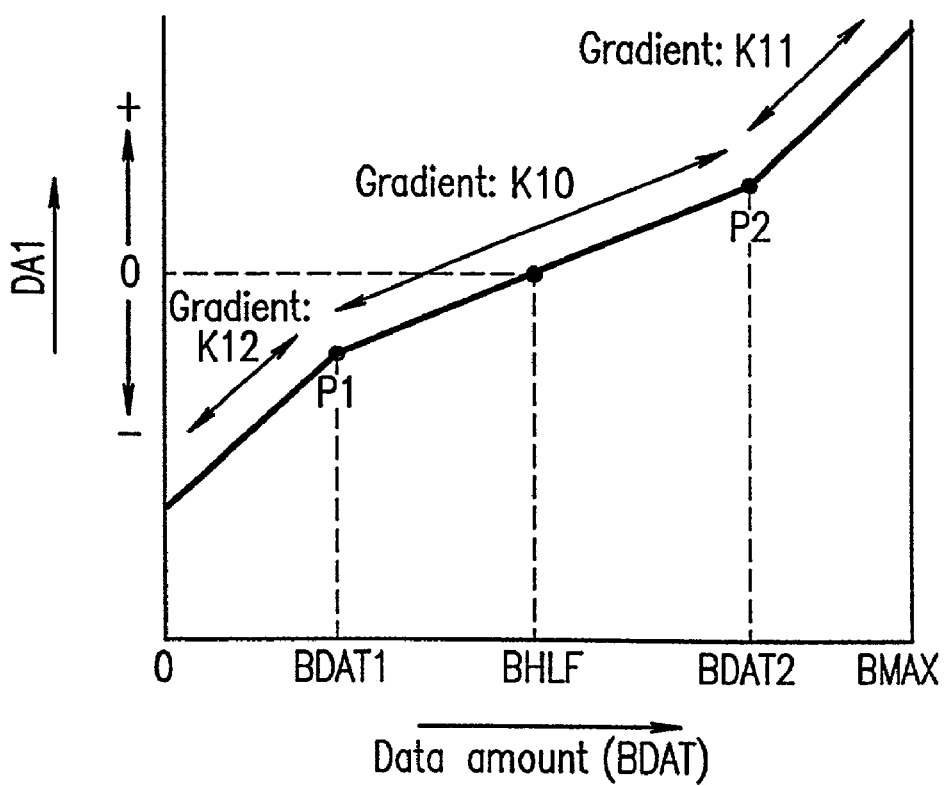
FIG. 7 is a graph showing another operating characteristic of the first comparator 6 of FIG. 1.

FIG. 7 is a graph showing another operating characteristic of the first comparator 6. The horizontal axis represents the data amount BDAT of the buffer 1, while the vertical axis represents the output data DA1 output from the first comparator 6. BMAX represents the amount of data corresponding to the total capacity of the buffer 1, while BHLF represents a half of the total capacity of the buffer 1. The operating characteristic of the first comparator 6 is set to be a line passing through a point (BHLF, 0) where the gradient is equal to K10, when the data amount BDAT is in the range from BDAT1 to BDAT2. The operating characteristic of the first comparator 6 is set to be a line having a gradient K11 when the data amount BDAT is in the range from BDAT2 to BMAX. The operating characteristic of the first comparator 6 is set to be a line having a gradient K12 when the data amount BDAT is in the range from 0 to BDAT1.

The gradient K11 is greater than the gradient K10, and the gradient K12 is also greater than the gradient K10.

When the first comparator 6 is set to have an operating characteristic as shown in FIG. 7, underflow and overflow of the buffer 1 can be effectively prevented even if short-cycle fluctuations occur in the input rate of digital data.

For example, even if the data amount BDAT is decreased due to extraordinary jitter or the like, and therefore, the data amount BDAT is shifted to an operating point below the data amount BDAT1, underflow and overflow of the buffer 1 can be prevented.

Figure 8:
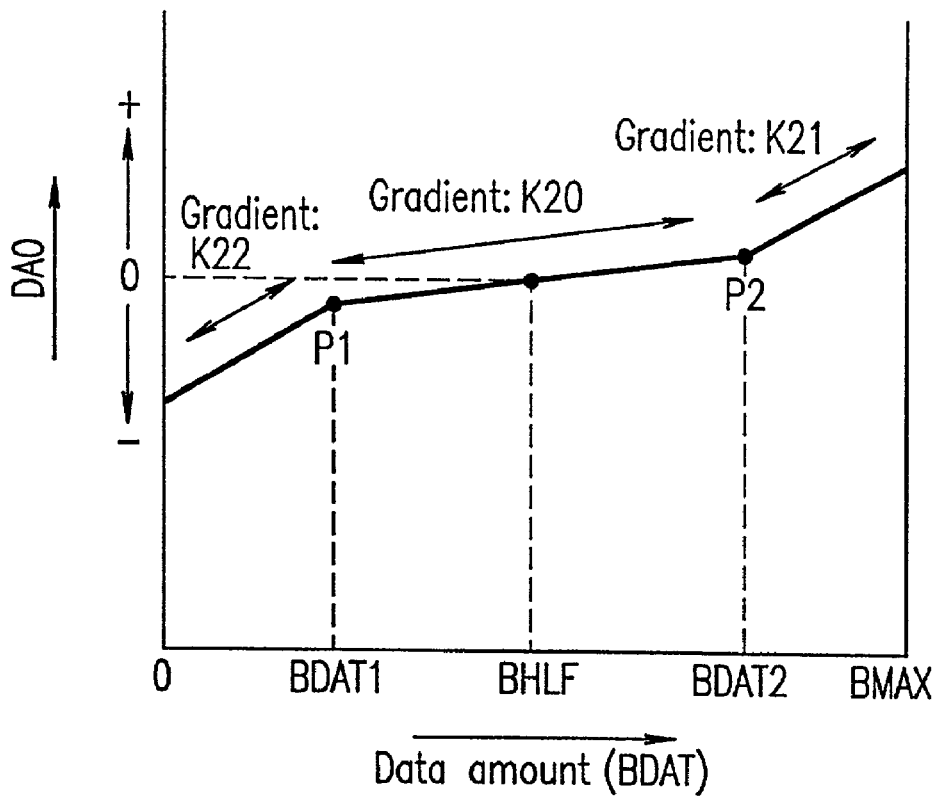
FIG. 8 is a graph showing another operating characteristic of the second comparator 8 of FIG. 1.

FIG. 8 is a graph showing another operating characteristic of the second comparator 8. The horizontal axis represents the data amount BDAT of the buffer 1, while the vertical axis represents the output data DA0 output from the second comparator 8. BMAX represents the amount of data corresponding to the total capacity of the buffer 1, while BHLF represents the amount of data corresponding to a half of the total capacity of the buffer 1. The operating characteristic of the second comparator 8 is set to be a line passing through a point (BHLF, 0) where the gradient is K20, when the data amount BDAT is in the range from BDAT1 to BDAT2. The operating characteristic of the second comparator 8 is set to be a line having a gradient K21 when the data amount BDAT is in the range from BDAT2 to BMAX. The operating characteristic of the second comparator 8 is set to be a line having a gradient K22 when the data amount BDAT is in the range from 0 to BDAT1.

The gradient K21 is greater than the gradient K20, and the gradient K22 is also greater than the gradient K20.

When the second comparator 8 is set to have an operating characteristic as shown in FIG. 8, underflow and overflow of the buffer 1 can be effectively prevented even if long-cycle fluctuations occur in the input rate of digital data.

Further, when the data amount BDAT of the buffer 1 is largely deviated from the amount BHLF of data corresponding to a half of the total capacity of the buffer 1, the control cycle of the second control section 7 may be changed so as to shorten the time constant of the second control section 7.

As described above, according to the digital AV signal processing apparatus of this example of the present invention, a ratio of the amount of a change in the frequency of a clock signal with respect to the amount of a change in a deviation in the data amount of a buffer when the deviation exceeds a predetermined range, is set to be greater than when the deviation is below the predetermined range. Therefore, overflow and underflow of the buffer can be prevented.

(Utilization of a Ring Buffer)

Note that in a configuration of the digital AV signal processing apparatus 100, the buffer 1 may be a ring buffer 21. Hereinafter, the digital AV signal processing apparatus 100 including the ring buffer 21 will be described.

Figure 9:
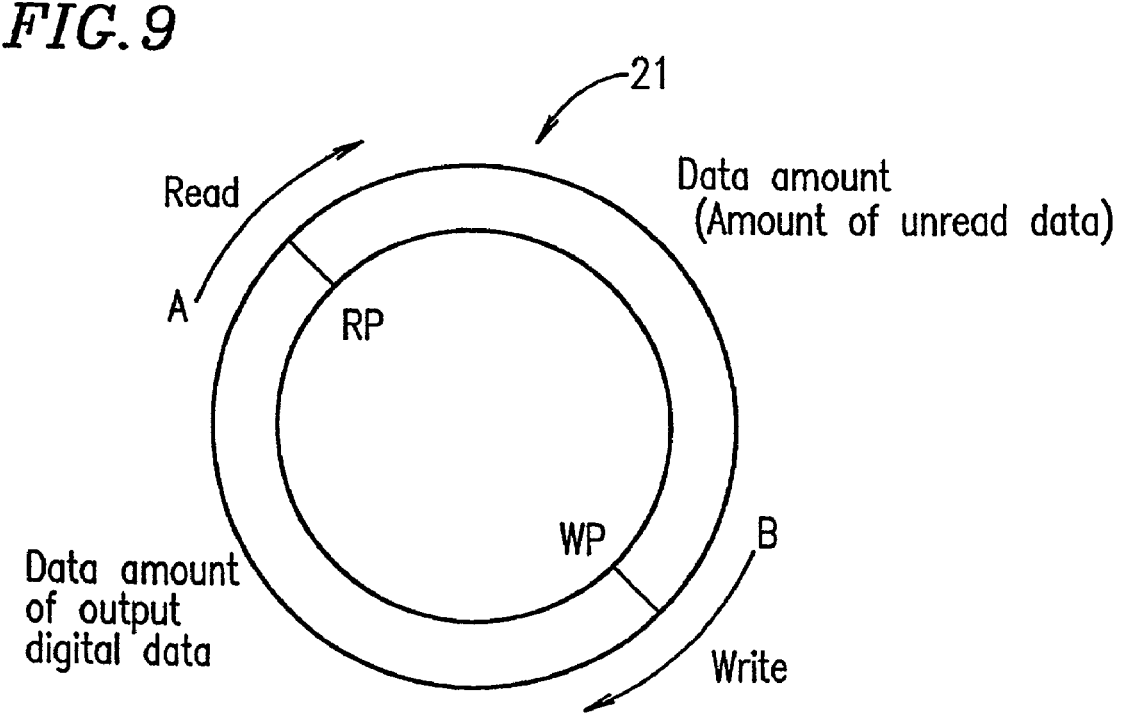
FIG. 9 is a diagram showing a concept of a ring buffer.

FIG. 9 is a diagram showing a concept of the ring buffer 21. Data from a reading position RP to a writing position WP along a direction indicated by arrow A is stored in the ring buffer 21, which have yet to be read. Data from the writing position WP to the reading position RP along a direction indicated by arrow B has already been output to the D/A converter 2. Data from the writing position WP to the reading position RP along the direction indicated by arrow B will be replaced with digital data which is newly received in the future.

Digital data received by the digital AV signal processing apparatus 100 is input to the ring buffer 21 from the writing position WP. The ring buffer 21 outputs digital data from the reading position RP.

The VCO controller 4 calculates the data amount of the digital data stored in the ring buffer 21 based on the reading and writing positions RP and WP. The VCO controller 4 changes at least one of the reading and writing positions RP and WP when the data amount exceeds a predetermined value which is greater than the data amount BHLF or when the data amount is below a predetermined value which is smaller than the data amount BHLF.

When data to be input to the ring buffer 21 is greatly delayed, the reading position RP catches up with the writing position WP, whereby underflow occurs. If a large amount of accumulated data due to the input delay is input to the ring buffer 21, the writing position WP catches up with the reading position RP, whereby overflow occurs.

However, the VCO controller 4 changes at least one of the reading and writing positions RP and WP so that the writing position WP does not catch up with the reading position RP, and the reading position RP does not catch up with the writing position WP. Therefore, overflow and underflow of the ring buffer 21 can be prevented. Further, in the case of underflow, since previous data stored in the ring buffer 21 is automatically output, substantially no sound skip occurs, for example. Further, since sound to be reproduced is data immediately before current data, the sound has a high level of correlation with the current data, whereby satisfactory sound can be advantageously reproduced.

Preferably, when the VCO controller 4 changes at least one of the reading and writing positions RP and WP, at least one of the reading and writing positions RP and WP is changed so that the data amount of the buffer 1 is substantially a half of the total capacity.

(When Digital Data is in the Form of a Packet)

Hereinafter, description will be given of the case where digital data to be input to the digital AV signal processing apparatus 100 is in the form of a plurality of packets.

Figure 10:
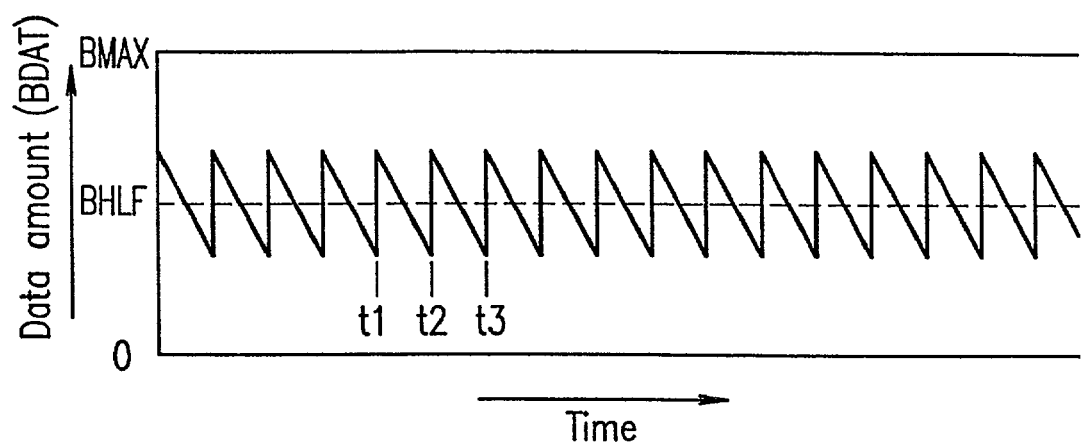
FIG. 10 is a graph showing fluctuations in the data amount of the buffer 1 shown in FIG. 1 with time where digital data to be input to the digital AV signal processing apparatus 100 of FIG. 1 is in the form of a plurality of packets.

FIG. 10 is a graph showing fluctuations with time in the data amount of the buffer 1 where digital data to be input to the digital AV signal processing apparatus 100 is in the form of a plurality of packets. The horizontal axis represents time, while the vertical axis represents the data amount BDAT of the buffer 1. BMAX represents the amount of data corresponding to the total capacity of the buffer 1, while BHLF represents the amount of data corresponding to a half of the total capacity of the buffer 1.

Every time a packet is received, new data in the packet is stored in the buffer 1. Subsequently, the data amount of the buffer 1 is constantly decreased until a subsequent packet is received. Thus, when digital data to be input to the digital AV signal processing apparatus 100 is in the form of packets, the data amount BDAT of the buffer 1 fluctuates in a sawtooth-like manner even if there is substantially no jitter. Therefore, the VCO controller 4 is set to detect the data amount of the buffer 1 in synchronization with the timing of the input of the packets. Further, the total capacity BMAX of the buffer 1 is preferably much greater than (e.g., two times or more greater than) the size of a packet.

As shown in FIG. 10, data amounts are read out at times t1, t2, t3 . . . in synchronization with the timing of the input of the packets, whereby the VCO controller 4 can detect correct data amounts.

As described below, even when digital data to be input to the digital AV signal processing apparatus 100 is divided into packets having different sizes, data amounts are read out in synchronization with the timing of the input of the packets, whereby the VCO controller 4 can detect the correct data amount in the buffer 1.

Figure 11:
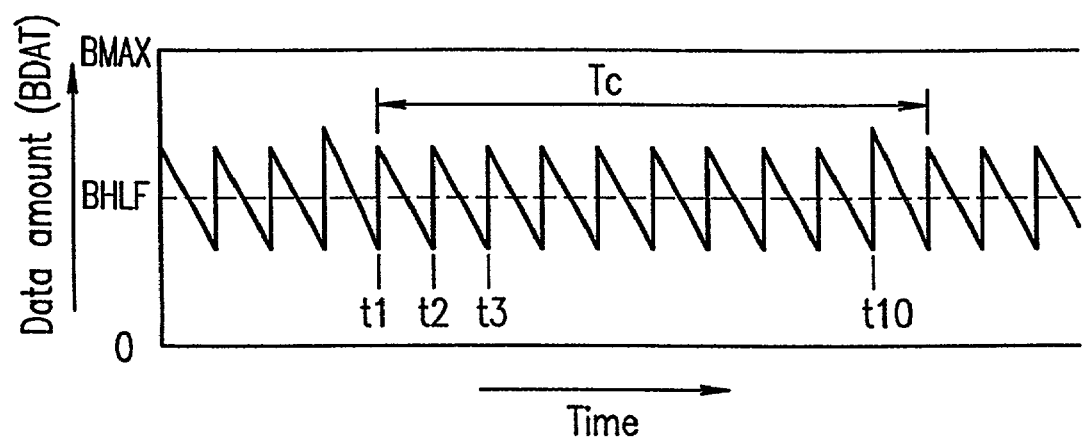
FIG. 11 is a graph showing fluctuations in the data amount of the buffer 1 shown in FIG. 1 with time where digital data to be input to the digital AV signal processing apparatus 100 shown in FIG. 1 is in the form of packets having different packet sizes.
Figure 12:
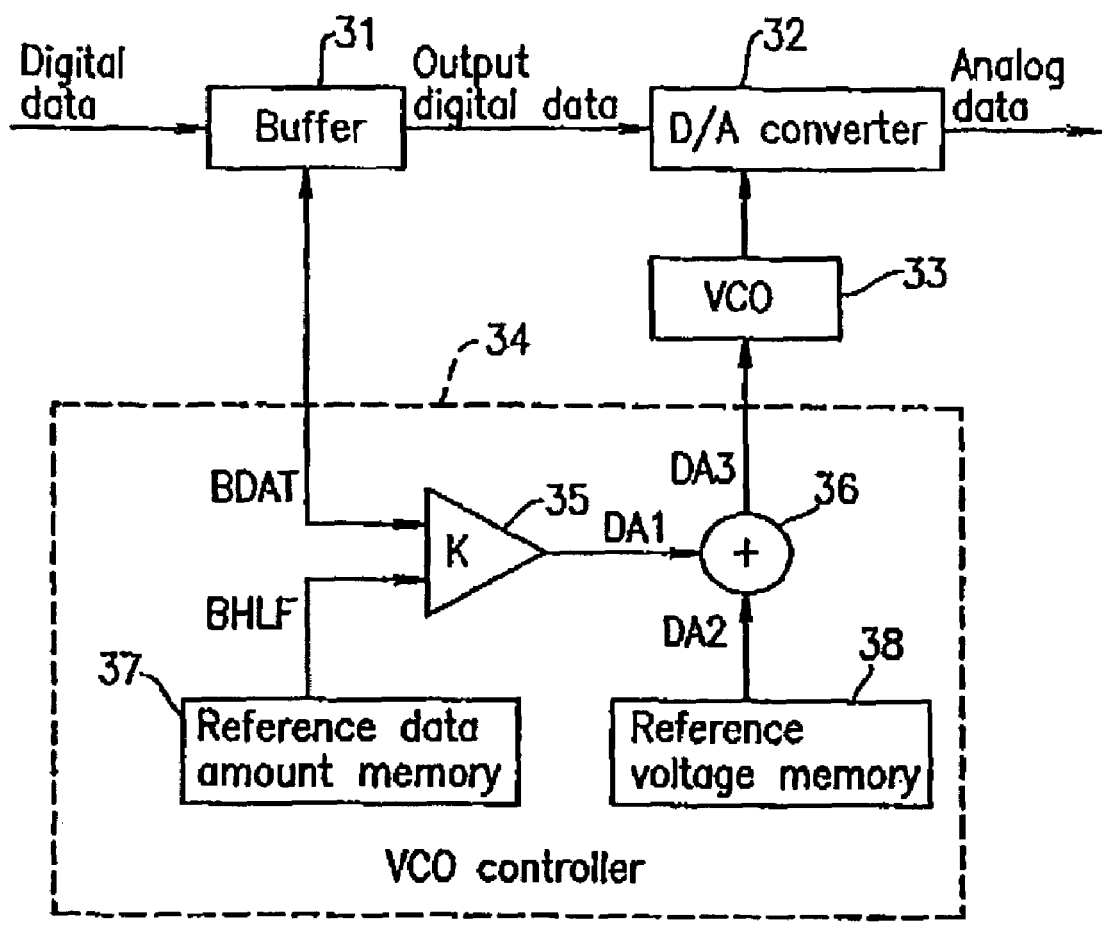
FIG. 12 is a diagram showing a configuration of a conventional digital AV signal processing apparatus 300.
Figure 13:
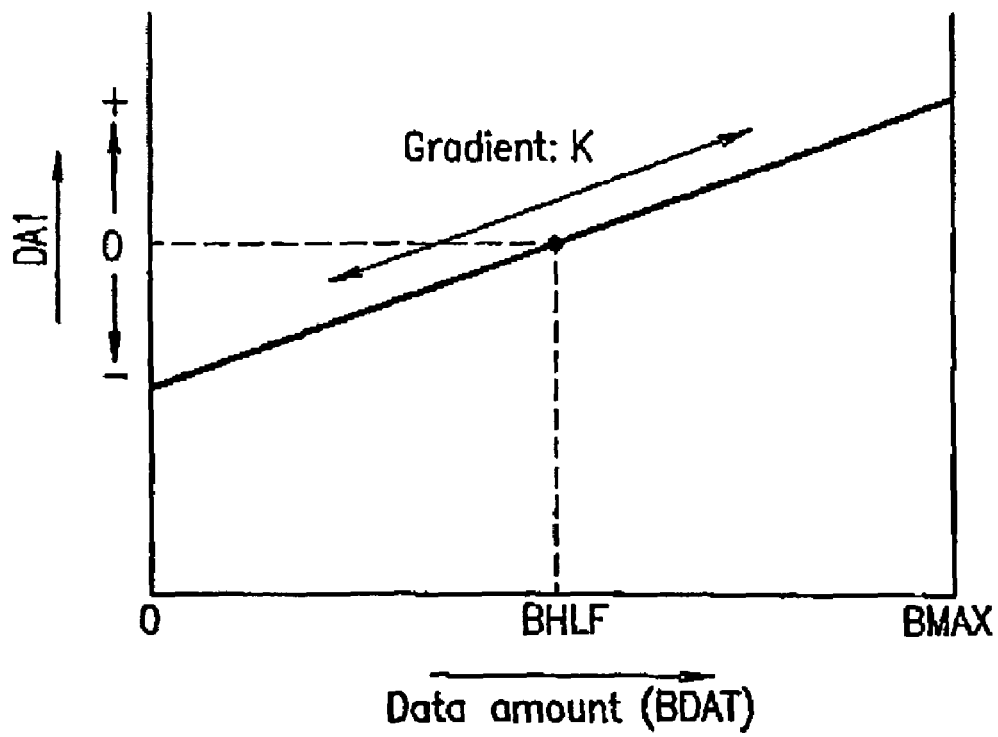
FIG. 13 is a graph showing an operating characteristic of a comparator 35 of FIG. 12.

FIG. 11 is a graph showing fluctuations with time in the data amount of the buffer 1 where digital data to be input to the digital AV signal processing apparatus 100 is in the form of packets having different packet sizes. The horizontal axis represents time, while the vertical axis represents the data amount BDAT of the buffer 1. BMAX represents the amount of data corresponding to the total capacity of the buffer 1, while BHLF represents the amount of data corresponding to a half of the total capacity of the buffer 1.

It is assumed that an audio signal in the IEC958 format (having a sampling frequency of 48 kHz and a transfer rate of 1.536 Mbps) is packet-transmitted on a universal serial bus (hereinafter referred to as a "USB"). Since a USB transmits packets having a length of 1 msec, a packet of 192 bytes is transmitted every one millisecond.

Alternatively, it is assumed that another audio signal in the IEC958 format (having a sampling frequency of 44.1 kHz and a transfer rate of 1.4112 Mbps) is packet-transmitted on a USB. Since a USB transmits packets having a length of 1 msec, a unit of data having a fixed length of 1764 bytes corresponding to 10 msec needs to be divided into 10 packets, for example, nine packets of 176 bytes and one packet of 180 bytes.

FIG. 11 shows fluctuations in the data amount of the buffer 1 with time where such an audio signal is transmitted (having a sampling frequency of 44.1 kHz and a transfer rate of 1.4112 Mbps).

In this transmission format, if the data amount of the buffer 1 is read out every time an element packet is input to the buffer 1. Since packets are irregular in size, the data amount of the buffer 1 cannot be correctly detected.

In order to easily detect a correct data amount, the data amount is detected in synchronization with the timing of the input of each packet group (a group of ten element packets including nine packets of 176 bytes and one packet of 180 bytes).

As described above, digital data is input to the digital AV signal processing apparatus 100 in the form of a plurality of packet groups. Each packet group includes nine first packets having a first data amount (176 bytes) and one second packet having a second data amount (180 bytes), which are arranged in a predetermined sequence. The VCO controller 4 detects the data amount of the buffer 1 in synchronization with the timing of the input of each packet group.

Thus, when digital data to be input to the digital AV signal processing apparatus 100 is in the form of packets, the data amount BDAT of the buffer 1 fluctuates in a sawtooth-like manner even if there is no jitter. Therefore, the VCO controller 4 included in the digital AV signal processing apparatus 100 can detect the data amount of the buffer 1 by reading out the data amount in synchronization with the timing of the input of the packets.

According to the digital AV signal processing apparatus of the present invention, the frequency of a clock signal is controlled based on a deviation in the data amount of digital data stored in a buffer from a predetermined value and the time integral of the deviation.

When the deviation in the data amount of digital data stored in a buffer from a predetermined value is steeply increased, a voltage-controlled oscillator controller rapidly controls the frequency of a clock signal based on the deviation in the data amount of digital data stored in a buffer from a predetermined value. Therefore, when there are short-cycle fluctuations in the input rate of digital data, the data amount of digital data stored in a buffer can be controlled to match a predetermined value.

When the data amount of digital data stored in a buffer is maintained constant while being deviated from a predetermined value, the time integral of the deviation is increased over time, so that the frequency of a clock signal is not maintained constant. Therefore, when there are long-cycle fluctuations in the input rate of digital data, the data amount of digital data stored in a buffer can be controlled to match a predetermined value.

Further, according to the digital AV signal processing apparatus of the present invention, the ratio of the amount of change in the frequency of a clock signal with respect to the amount of a change in the deviation of the data amount of a buffer when the deviation exceeds a predetermined range, is set to be greater than when the deviation is below the predetermined range. Therefore, overflow and underflow of the buffer can be prevented.

Still further, according to the digital AV signal processing apparatus of the present invention, a ring buffer can be used as a buffer and at least one of a writing position and a reading position of the ring buffer can be changed. Therefore, overflow and underflow of the ring buffer can be prevented.

Furthermore, according to the digital AV signal processing apparatus of the present invention, even when digital data input to the digital AV signal processing apparatus is in the form of packets, the data amount of a buffer is detected in synchronization with the timing of the input of the packets. Therefore, the correct data amount of the buffer can be detected.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A digital AV signal processing apparatus, comprising:
   a buffer for storing digital data input to the digital AV signal processing apparatus, and outputting the digital data as output digital data;
   a D/A converter for converting the output digital data to analog data;
   a voltage-controlled oscillator for generating a clock signal to control a conversion rate of the D/A converter; and
   a voltage-controlled oscillator controller for detecting a data amount of the digital data stored in the buffer, and controlling a frequency of the clock signal based on a deviation in the detected data amount from a first predetermined value and a time integral of the deviation value,
   wherein the voltage-controlled oscillator controller comprises:
   a first comparator that detects the deviation in the detected data amount from the first predetermined value and outputs first output data based on the deviation and a gain K1, and
   a second comparator that detects the deviation in the detected data amount from the first predetermined value and outputs second output data based on the deviation and a gain K2.

2. A digital AV signal processing apparatus according to claim 1, wherein the voltage-controlled oscillator controller controls the frequency of the clock signal in such a manner that a ratio of the amount of a change in the frequency of the clock signal with respect to the amount of a change in the deviation in the data amount of the buffer when the deviation exceeds a predetermined range, is set to be greater than when the deviation is below the predetermined range.

3. A digital AV signal processing apparatus according to claim 1, wherein:
   the buffer is a ring buffer;
   the digital data input is input to the ring buffer from a writing position of the ring buffer;
   the ring buffer outputs the digital data to a reading position of the ring buffer;
   the voltage-controlled oscillator controller calculates the data amount of the digital data stored in the ring buffer based on the reading position and the writing position; and
   the voltage-controlled oscillator controller changes at least one of the reading position and the writing position when the data amount exceeds a predetermined second value greater than the first predetermined value or when the data amount is below a third value less than the first predetermined value.

4. A digital AV signal processing apparatus according to claim 3, wherein the voltage-controlled oscillator controller changes at least one of the reading position and the writing position in such a manner that the data amount is substantially a half of a capacity of the ring buffer.

5. A digital AV signal processing apparatus according to claim 1, wherein the digital data is input to the digital AV signal processing apparatus in the form of a plurality of packets, and the voltage-controlled oscillator controller detects the data amount of the buffer in synchronization with a timing of the input of the plurality of packets.

6. A digital AV signal processing apparatus according to claim 1, wherein:
   the digital data is input to the digital AV signal processing apparatus in a form of a plurality of packet groups, each of the plurality of packet groups including a predetermined number of first packets having a first data amount and a predetermined number of second packets having a second data amount arranged in a predetermined sequence; and
   the voltage-controlled oscillator controller detects the data amount of the buffer in synchronization with a timing of the input of the plurality of packet groups.

7. A digital AV signal processing apparatus according to claim 1, wherein K2 is less than K1.

8. A digital AV signal processing apparatus, comprising:
   a buffer for storing digital data input to the digital AV signal processing apparatus, and outputting the digital data as output digital data;
   a D/A converter for converting the output digital data to analog data;
   a voltage-controlled oscillator for generating a clock signal to control a conversion rate of the D/A converter; and
   a voltage-controlled oscillator controller for controlling a frequency of the clock signal so as to maintain a data amount in the buffer, said voltage-controlled oscillator controller including a first control section and a second control section, wherein
   the first control section comprises a first comparator that detects a deviation between a predetermined value and the data amount in the buffer and outputs first output data based on the deviation and a gain K1, and
   the second control section comprises a second comparator that detects the deviation between the predetermined value and the data amount in the buffer and outputs second output data based on the deviation and a gain K2.

9. A digital AV signal processing apparatus according to claim 8, wherein K2 is less than K1.

10. A digital AV signal processing apparatus according to claim 8, wherein the second control section further comprises an integrator that calculates the time integral of the second output data.

11. A digital AV signal processing apparatus according to claim 10, wherein the voltage-controlled oscillator controller further comprises an adder operatively coupled to the voltage-controlled oscillator, wherein the adder adds the first output data and the time integral of the second output data and outputs a control signal that controls the frequency of the clock signal.

* * * * *